Patented Jan. 8, 1946

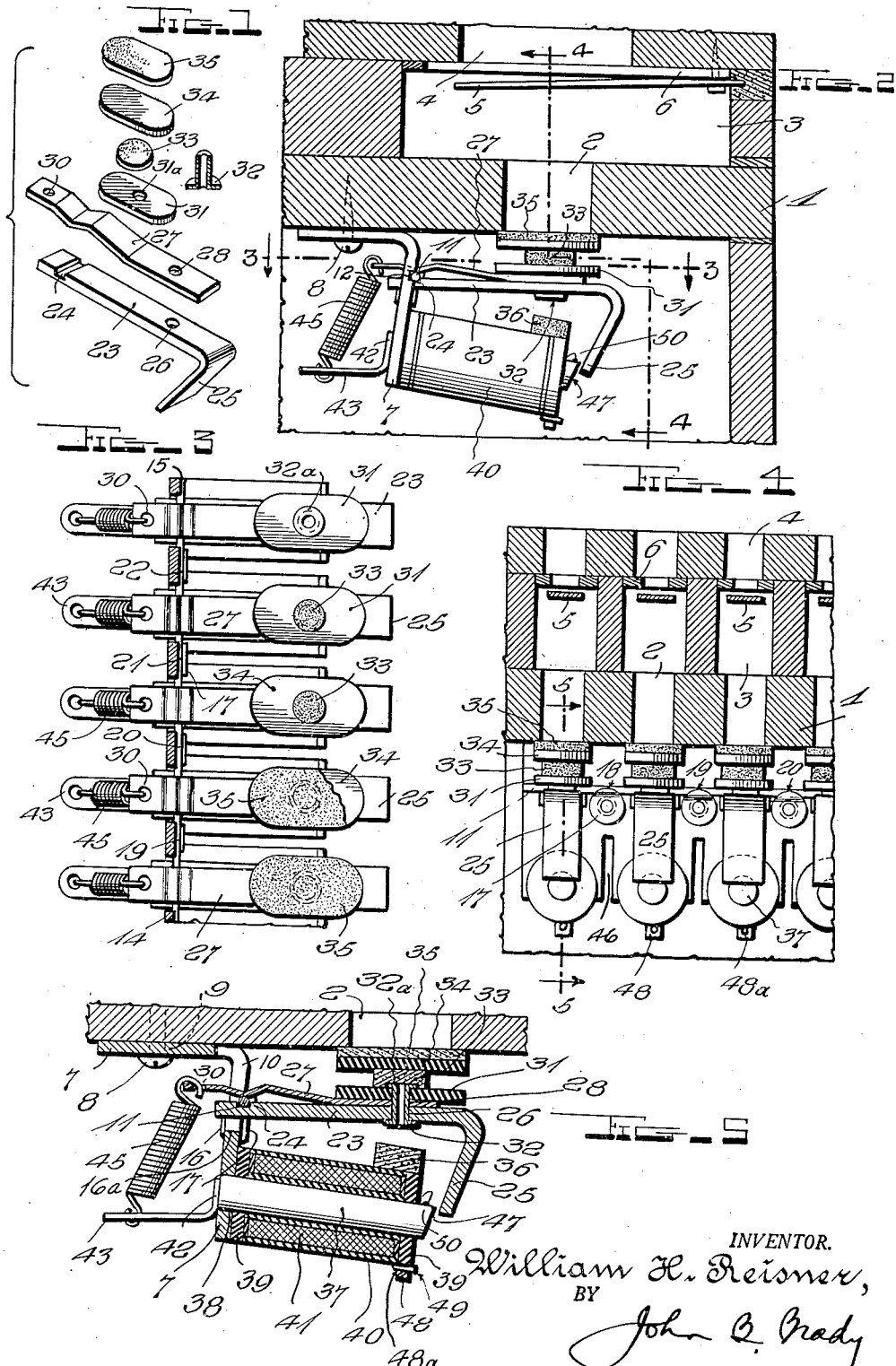

2,392,411

UNITED STATES PATENT OFFICE 2,392,411

MULTIPLE MAGNETIC VALVE FOR ORGANS

William H. Reisner, Hagerstown, Md., assignor to The W. H. Reisner Mfg. Co., Inc., Hagerstown, Md., a corporation of Maryland Original application July 26, 1941, Serial No. 404,229. Divided and this application August 10, 1943, Serial No. 498,109

6 Claims. (Cl. 84—339)

My invention relates broadly to electric valve actions and more particularly to an electrically operated organ valve.

This application is a division of my application Serial No. 404,229, filed July 26, 1941, for Multiple magnetic valve for organs, now Patent 2,335,311, granted November 30, 1943.

One of the objects of my invention is to provide a construction of organ valve including a valve member comprising a multiplicity of alternately disposed layers of relatively soft and relatively stiff laminations carried by a valve actuator and adapted to be moved to open or closed positions for establishing sealing connection with a valve seat.

Another object of my invention is to provide a relatively flexible stack of laminations constituting a valve structure and operative to be shifted by a valve actuator to either open or closed position with respect to a valve seat for silently controlling an acoustic passage.

Still another object of my invention is to provide an improved stack arrangement of pads for a valve structure carried by a valve actuator and coacting with an acoustic passage for silently and firmly closing or opening the acoustic passage.

Other and further objects of my invention reside in a construction of pad for organ valves as set forth more fully in the specification hereinafter following by reference to the accompanying drawing, in which:

Figure 1 is a perspective view showing the parts which are superimposed upon each other for forming the pad of the valve structure; Fig. 2 is a side elevation of a valve actuator equipped with the pad construction of my invention; Fig. 3 is a plan view taken substantially on line 3—3 of Fig. 2 showing a plurality of valve actuators equipped with pads arranged in accordance with my invention and illustrating the pads in plan view, certain of which have the laminations partially broken away or removed to more clearly explain the construction of the pad; Fig. 4 shows an end view of the valve actuators and pads carried thereby, the view being taken on line 4—4 of Fig. 2 to show the valve seats and associated acoustic passages in section; and Fig. 5 is a vertical sectional view taken on line 5—5 of Fig. 4 showing the valve pad of my invention mounted in position with respect to the valve actuator.

Referring to the drawing in more detail, Figure 1 illustrates the parts of the laminated pad constituting the organ valve of my invention where the parts are illustrated in perspective view in superimposed relation to the armature member and the spring tension device associated therewith. The magnetic armature is represented at 23 having a groove 24 adjacent one end and an angularly disposed portion 25 adjacent the opposite end. A resilient leaf spring member 27 is apertured at 28 adjacent one end in registry with aperture 26 in the magnetic armature 23. The opposite end of leaf spring 27 is apertured at 39 for facilitating the mounting of the armature under spring tension as will be hereinafter described. A plate of insulation material 31 which is of elongated contour rounded at each end is apertured at 31a in registry with apertures 26 and 28. The tubular rivet 32 passes through aperture 26 in armature 23 and aperture 28 in resilient leaf spring 27 and aperture 31a in the plate of insulation material 31 for securing these three members in superimposed position. The tubular rivet 32 is then up-set or clinched in position to form the securing flange 32a thereon as shown more particularly in Figs. 3 and 5. A resilient pad member 33 is then secured over the flange 32a of the rivet 32 and over the plate of insulation material 31 by suitable cement or glue. The plate of insulation material 31 is relatively stiff whereas the resilient pad member 33 is relatively soft. The resilient pad member 33 supports the relatively stiff plate of insulation material 34 which is suitably cemented or glued thereto. The plate of insulation material 34 is shaped to correspond to the shape of the relatively stiff plate of insulation material 31. The relatively stiff plate of insulation material 34 supports the relatively soft facing pad 35 which is suitably cemented or glued thereto. The soft facing pad 35 is shaped to conform with the contour of the relatively stiff plates of insulation material 31 and 34. The soft facing pad 35 forms the sealing means for the port 2 for closing the acoustic passage to the reed pressure box 3 and outlet 4. The peripheral edge of port 2 forms one of the limiting abutments for movement of armature 23 while the opposite limiting abutment is provided by resilient stop 36 carried by the control magnet spool head.

In order that the functioning of the laminated valve structure formed by alternate stiff and soft laminations may be fully understood, it is necessary to describe in some detail the associated parts of the magnetic actuator employed with the valve mechanism of my invention.

Reference character 1 indicates the pressure chamber having ports 2 therein leading to the reed pressure box 3, having an outlet indicated at 4. The reed is indicated at 5, mounted at one end on the reed supporting frame 6. As represented in Fig. 4, the several reed pressure boxes 3 are partitioned one from the other for the independent passage of air therethrough under control of the electric valve action. It will be understood that the electric valve action of my invention may be used for both vacuum and pressure arrangements as in the usual pipe organ system, and that the illustration of my invention in association with a reed system is merely for the purpose of illustrating one application of my invention.

The bracket for mounting the several electromagnets is represented at 7, secured by suitable means 8 to the wall of the pressure chamber 1. The bracket 7 is provided with apertures 9 therein through which a suitable number of securing means 8 may be passed. Perforations 10 are struck out of the material forming the brackets 7 and grooves 12 are provided in the material of bracket 7 through which bearing rod 11 extends. Bearing rod 11 is spot-welded at opposite ends 14 and 15 in the aligned grooves 12. The bearing rod 11 may also be spot-welded to the material of bracket 7 intermediate the ends 14 and 15. Preparatory to the spot-welding operation the bearing rod 11 is retained in position in the aligned grooves 12 by means of tubular rivets 16a which extend through apertures 16a in brackets 7 and secure clamping members 17 over the bearing rod 11. After the bearing rod 11 is thus secured in position it may be spot-welded to the bracket at the ends 14—15 and also in intermediate positions 18, 19, 20, 21 and 22.

The bearing rod 11, extending transversely across the perforations 10 is now ready to receive the several rockable armature members which control the electric valve action. The armatures 23 are mounted with respect to bearing rod 11 by slipping the armatures through the perforations 10 to positions in which the groove 24 therein receives bearing rod 11 while leaf spring 27 bears against bearing rod 11 as shown more clearly in Fig. 5. As heretofore explained, the leaf spring 27 is secured at one end to the armature 23 while the opposite end of the leaf spring is apertured at 30 to provide a connection for coil spring 45 as hereinafter explained.

The control magnet comprises the magnetic core 37 which is secured in aperture 38 in magnetic bracket 7. Core 37 is welded within aperture 38 in magnetic bracket 7 and projects therefrom. Spool heads 39 are provided adjacent opposite ends of core 37 and intermediate these spool heads the operating winding 41 is arranged. The operating winding 41 is suitably insulated by a wrapping of insulation material 40 which extends about the magnetic winding 41. One of the spool heads 39 has a perforated ear 43 extending therefrom with a girdle or band of solder or fusible metal 49 thereon to provide a terminal for the end of the operating winding 41. The perforation in ear 43 is shown at 43a forming a securing means for the connecting wire which connects the winding in the circuit. The other end of the operating winding 41 is grounded to the core 37, as indicated at 50. Circuits to the several electromagnets are thus completed by grounding to bracket 7 on the one side and by connection of individual wires to the solder girdles or bands 49 on the other side.

The bracket or tongue 42 which forms the connecting means for the coil spring 45 that tensions the movable armature, is welded to the end of core 37 and has a projecting end 43 extending from core 37. Coil spring 45 connects between the projecting end 43 of tongue 42 and the apertured end 30 of leaf spring 27. The core 37 is suitably shaped at the end 47 to coact with the angularly disposed end 25 of rockable armature 23 to insure maximum utilization of the magnetic lines of force which extend around the magnetic circuit established through magnetic core 37, magnetic bracket 7, magnetic armature 23 and the shaped end 25 thereof.

As before noted the magnetic bracket 7 is slotted at 46 intermediate each of the portions of the bracket which are apertured at 38 so that the magnetic lines of force which thread the portions of the bracket 7 are maintained substantially independent and confined to substantially separate paths for controlling the rapid and various functioning of the several valves within a small area.

The laminated valve structure of my invention has many advantages in insuring a sealing connection with the acoustic passage. It will be noted that one relatively rigid or stiff pad member is rigidly connected with the valve actuator. The relatively soft and resilient lamination that is carried by the relatively stiff lamination constitutes a coupling or intermediate link member on which the second relatively rigid or stiff lamination is mounted. This second relatively stiff or rigid lamination carries a resilient or flexible facing pad which forms the sealing connection with the acoustic passage. The relatively stiff or rigid laminations are of the same shape and contour and are greater in transverse dimension than the intermediate resilient pad. The relatively stiff lamination that is carried by the smaller intermediate resilient pad is accordingly free to be angularly displaced sufficiently to effect a centering and sealing connection with the acoustic passage for effectively closing the passage.

It will be understood that the electric valve action of my invention may be employed as a single unit or may be arranged in the multiple coacting units illustrated herein. The construction shown has been found to be very practical for manufacture and production and successful in operation. However, although I have described the preferred embodiment of my invention, I realize that modifications may be made and I intend no limitations upon my invention other than may be imposed by the scope of the appended claims.

What I claim as new and desire to secure by Letters Patent of the United States is as follows:

1. In an organ valve mechanism including a valve actuator operative with respect to an organ valve seat, a valve comprising a multiplicity of alternately disposed layers of relatively soft and relatively stiff laminations, means for securing one of the relatively stiff laminations to the valve actuator, said layers including a relatively soft intermediate lamination secured to said last mentioned relatively stiff lamination, a relatively stiff lamination secured to said relatively soft intermediate lamination, and a relatively soft lamination carried by said last mentioned relatively stiff lamination, said relatively soft intermediate lamination having a transverse dimension less than the transverse dimensions of either of said relatively stiff laminations whereby said last mentioned relatively stiff lamination is free to tilt angularly with respect to said first mentioned relatively stiff lamination with said relatively soft lamination operating as a coupling member therebetween for adjusting said last mentioned relatively soft lamination into sealing relation with said organ valve seat.

2. In a valve mechanism for organs including a valve actuator operative with respect to an organ valve seat, a valve comprising a stack of alternate relatively rigid and flexible laminations, means for securing one of the rigid laminations to the valve actuator, said stack including an intermediate relatively flexible lamination united to the aforesaid relatively rigid lamination, a second relatively rigid lamination secured to said intermediate relatively flexible lamination, and a relatively flexible lamination carried by said second relatively rigid lamination and coacting with said organ valve seat, said intermediate relatively flexible lamination being restricted in transverse dimension with respect to the relatively rigid laminations whereby said second relatively rigid lamination is free to tilt with respect to said first mentioned relatively rigid laminations for adjusting said second mentioned relatively flexible lamination to sealing relation with said organ valve seat.

3. In a valve mechanism for organs including a valve actuator operative with respect to a valve seat, a valve comprising a multiplicity of alternately disposed relatively rigid and resilient pad members, a connection between one of the rigid pad members and the valve actuator, a connection between one of the resilient pad members and said last mentioned rigid pad member, a rigid pad member carried by said resilient pad member, said resilient pad member being of relatively small diameter with respect to the rigid pad member carried thereby, said last mentioned rigid pad member being free to tilt in angular position with respect to said first mentioned rigid pad member, and a flexible pad member carried by the said tiltable second mentioned rigid pad member and operative to form sealing connection with the valve seat.

4. In a valve mechanism for organs including a valve actuator operative with respect to an organ valve seat, a valve comprising a stack of alternate layers of relatively stiff and relatively soft material, means for securing one of the relatively stiff laminations to said valve actuator, the relatively soft lamination secured to said last mentioned relatively stiff lamination being of smaller lateral dimension than said relatively stiff laminations for allowing angular displacement of the relatively stiff lamination which is superimposed thereon with respect to the first mentioned relatively stiff lamination which is secured to said valve actuator.

5. In a valve mechanism for organs including a valve actuator operative with respect to a valve seat, a valve comprising a multiplicity of alternately disposed relatively rigid and resilient pad members, a rivet extending through said valve actuator and one of said rigid pad members, one of the resilient pad members overlying the rivet connection for the aforesaid rigid pad member, a second rigid pad member carried by said resilient pad member, said resilient pad member being of smaller transverse dimension than the rigid pad member carried thereby whereby the rigid pad member carried by said resilient pad member is free to shift in angular position with respect to said first mentioned rigid pad member, and a flexible pad member carried by said shiftable second mentioned rigid pad member and operative to form sealing connection with the valve seat.

6. In a valve mechanism for organs including a valve actuator operative with respect to a valve seat, a valve comprising a multiplicity of alternately disposed relatively rigid and resilient pad members, a rigid connection between one of said rigid pad members and the valve actuator, a connection between one of the resilient pad members and said last mentioned rigid pad member, a second rigid pad member carried by said resilient pad member, said resilient pad member having a relatively narrower transverse dimension than said rigid pad members whereby the rigid pad member carried by said resilient pad member is free for restricted angular displacement with respect to said first mentioned rigid pad member, and a flexible pad member carried by said shiftable second mentioned rigid pad member and operative to form sealing connection with the valve seat.

WILLIAM H. REISNER.